US005549174A

United States Patent [19]
Reis

[11] Patent Number: 5,549,174
[45] Date of Patent: Aug. 27, 1996

[54] RECOVERY SYSTEM FOR DISSIPATED ENERGY OF AN ENGINE MOTOR VEHICLE DURING ITS RUNNING CONDITIONS

[76] Inventor: Gianluigi Reis, Via Vettabbia, 6, 20122 Milan, Italy

[21] Appl. No.: 311,136

[22] Filed: Sep. 23, 1994

[30] Foreign Application Priority Data

Sep. 27, 1993 [IT] Italy .................. MI93A2054

[51] Int. Cl.⁶ .............. B60K 6/00; B60K 13/04; F01K 23/06
[52] U.S. Cl. .............................. 180/165; 60/618
[58] Field of Search ................. 180/165, 301, 180/302, 303, 304, 305, 306, 65.2, 65.3, 65.4; 60/618

[56] References Cited

U.S. PATENT DOCUMENTS

| | | | |
|---|---|---|---|
| 3,986,575 | 10/1976 | Eggmann | 180/302 |
| 4,123,910 | 11/1978 | Ellison, Sr. | 60/698 |
| 4,290,268 | 9/1981 | Lowther | 180/165 |
| 4,366,674 | 1/1983 | Eakman | 60/618 |
| 4,442,073 | 4/1984 | Haworth | 60/618 |
| 4,470,476 | 9/1984 | Hunt | 180/65.3 |
| 4,570,767 | 5/1986 | Gardner, Jr. | 180/165 |
| 4,586,338 | 5/1986 | Barrett et al. | 60/618 |
| 4,827,798 | 5/1989 | Oldfield | 188/269 |

FOREIGN PATENT DOCUMENTS

| | | | |
|---|---|---|---|
| A0060159 | 9/1982 | European Pat. Off. . | |
| 0510582 | 10/1992 | European Pat. Off. | 180/65.2 |
| A2489418 | 3/1982 | France . | |
| A3039773 | 7/1982 | Germany . | |
| A3623159 | 2/1988 | Germany . | |
| A2033017 | 5/1980 | United Kingdom . | |
| A8000992 | 5/1980 | WIPO . | |
| A8602977 | 5/1986 | WIPO . | |

OTHER PUBLICATIONS

European Search Report, Jun. 23, 1994, Examiner Nordlund, J.

Primary Examiner—Richard M. Camby
Assistant Examiner—Frank Vanaman
Attorney, Agent, or Firm—Hedman, Gibson & Costigan, P.C.

[57] ABSTRACT

The instant invention is referred to a recovery system for the dissipated energy of an engine motor vehicle during its running conditions; such a system is substantially formed by the following subsystems:

subsystem A: primary cooling system
subsystem B: secondary cooling system
subsystem C: exhaust gases circuit
subsystem D: compressed air circuit
subsystem E: braking circuit having an air compressor Such a system, wherein the thermal energy dissipated during the cooling of the engine motor and the kinetic energy ½ mv² dissipated during the braking action of the vehicle, are both recovered in form of potential energy represented by compressed air, which is stored in a suitable storage vessel for its later use to produce mechanical energy, implies remarkable advantages, in an absolute sense, for the huge saving of fuel and also for the absence of pollution of the environmental air.

5 Claims, 1 Drawing Sheet

U.S. Patent    Aug. 27, 1996    5,549,174
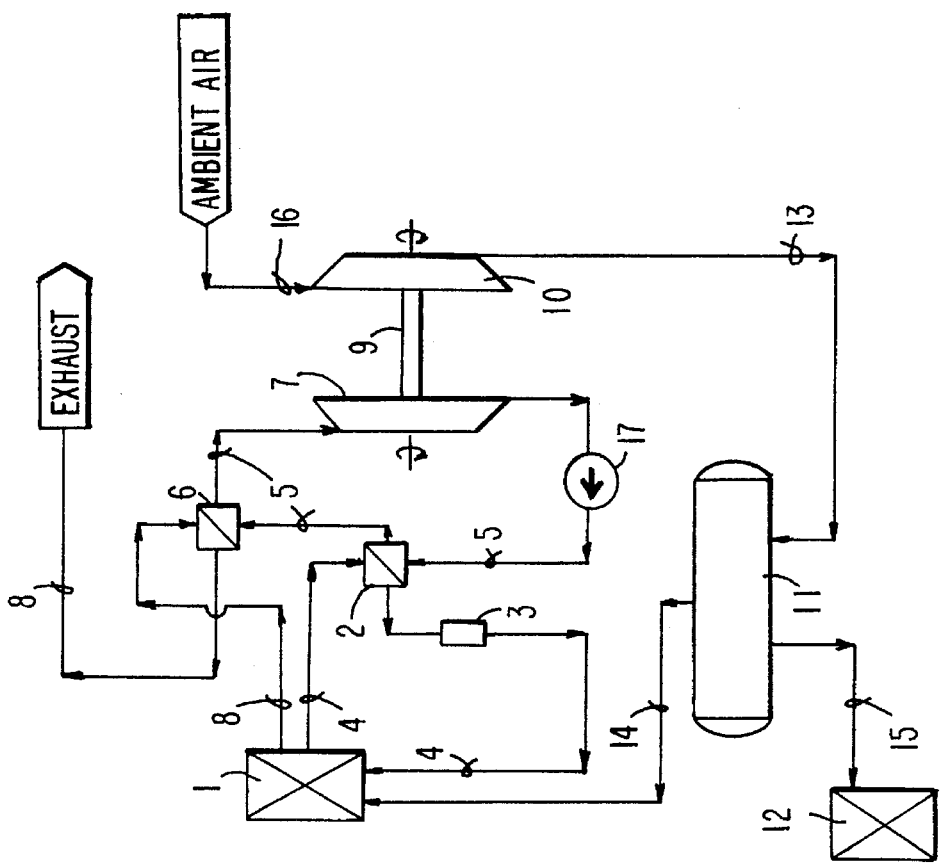
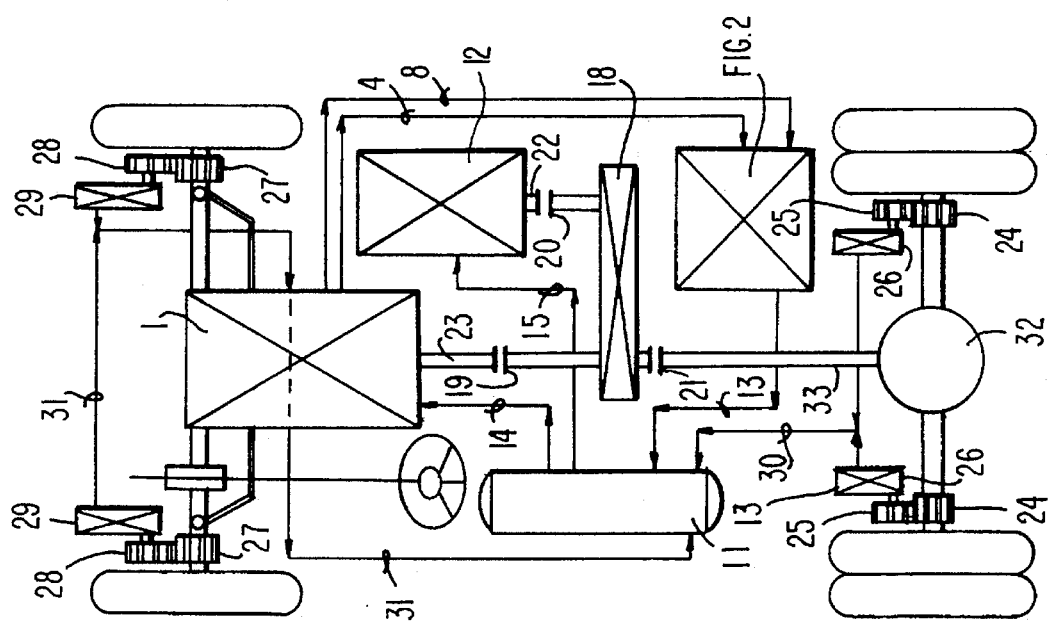

RECOVERY SYSTEM FOR DISSIPATED ENERGY OF AN ENGINE MOTOR VEHICLE DURING ITS RUNNING CONDITIONS

It is well known the fact that internal combustion engine vehicles do disperse during their running conditions, a high quantity of heat, harmful smokes and noise into the surrounding ambient air.

The exhaust gases (smokes) discharged by an internal combustion engine vehicle in residential districts of geographical areas, having a standstill ambient air, are always one of the main components of air pollution in urban areas.

In the same way, the noise produced by the engines and the vehicles during their running conditions, particularly in urban traffic, represents one of the main components of environmental acoustical pollution.

As to the heat dissipation, this is due to the fact that only a small part of flue heat energy, burnt by internal combustion engine installed on vehicles, is converted into a mechanical energy useful for vehicle motion itself.

Indeed a remarkable quantity of heat is dissipated by the engine cooling water system, through the radiator and an equivalent quantity of heat is also dissipated by exhaust gases (smokes) at a high temperature, by the silencer of running engine vehicle.

Another loss of heat is due to the movement of vehicle during its braking till stopping situation, when mechanical energy, due to the movement of the vehicle mass, is converted into thermal energy in the braking system installed on wheels of vehicle same.

Up to now there is no notice of particular studies of systems and applications able to solve, or at least to reduce such problems of environmental pollution and heat dissipation.

The referred applications in this field are above all aiming to improve only the combustion control, to use exhaust gas powered turbines, to use "clean" fuels, e.g. unleaded petrol, whereas they do not aim to recover the heat losses.

Therefore, the system described in the following is developing a mechanical solution based on a new process to recover the energy dissipated in form of heat by a vehicle during its running conditions. This recovery is performed by means of compressed air, principally generated in two manners by air compressors, and put at disposal in a suitable compressed air storage vessel.

In the first recovery manner of dissipated energy, the air compressor is coupled through the same rotation shaft with a steam turbine operated by a suitable fluid which vaporizes at a low temperature value. The air compressor is connected with an air storage vessel, which serves as a storage unit for the whole energy recovery system. The low vaporization temperature fluid, already vaporized by the cooling water system of internal combustion engine, installed on the vehicle, is superheated by the engine exhaust gases to such a temperature value, to allow a consequent expansion in a suitable steam turbine, with a profitable production of mechanical work, and therefore energy recovery possibility with a better efficiency of optimized system as above.

In detail, the vaporization of low vaporization temperature fluid is obtained in a heat exchanger wherein cooling water of internal combustion engine works as primary fluid.

In the second way of recovery of dissipated energy, the air compressor is replacing the braking system of running vehicle. Indeed increasing of kinetic energy of a moving mass during a time period is equal to the work performed by the same force causing the movement, during the same period of time as defined. In other words, an increasing of kinetic energy requires work, a decreasing of kinetic energy supplies work in any mechanical system.

This is what takes place during running conditions of a vehicle having an internal combustion engine. The movement takes place by expensing of thermal power generated by fuel in the working cycle of internal combustion engine, installed on the vehicle. During the vehicle braking phase, the produced engine work transformed in kinetic energy of mass, represented by moving vehicle itself, is dispersed as heat, i.e. nullified, by the action of brakes operating in predetermined time period, necessarily a short time. The braking system, able to recover the kinetic energy $½ mv^2$ of engine vehicle, which will be anyway dissipated as loss of heat, according to the conventional systems, is replaced by an air compressor having a variable compression ratio, according with the quickness required by braking action. The variable compression ratio is obtained by an appropriate adjustement of opening and closing valves of compression chamber in the above mentioned compressor.

Compressed air, obtained as above, is finally stored into the accumulation storage vessel, which is a part of dissipated energy recovering system of an engine motor vehicle during its running conditions.

The compressed air, obtained both by recovering the dissipated energy of internal combustion engine cooling system, and also by air compressor having a variable compression ratio, replacing the braking system, is stored in the system storage vessel and therefore put at disposal of said system according to the recoverable thermal energy to be re-transformed into useful work, i.e. as working fluid in an auxiliary motor, which operates by means of compressed air. Furthermore, at the same time the above air is put at disposal in the internal combustion engine as supercharging necessary for a correct combustion, in other words as a means to obtain the maximum efficiency of the working cycle of the engine installed on the running vehicle.

Several advantages can be obtained by means of this invention process for recovering the already dissipated thermal energy.

In particular, in case of urban vehicles for passengers transport, the possibility of making use of an auxiliary compressed air motor causes a drastic cutting down of air pollution, caused by exhaust gases of the internal combustion engines, during the discontinuous progress of vehicles in queues during traffic jams. The more, the use of compressed air motor does not cause any noise pollution and this, apart from the great fuel saving, is one of the basic advantages of non-pollution as an absolute item.

The fuel saving is a very considerable point. It must be reminded that every HP of useful power at motive wheels of vehicle, causes in general another HP dissipated with engine cooling water system, and also with exhaust gas system.

As to convenience of thermal energy recovering during vehicle braking phase, it is sufficient to imagine that for a public service bus of 12 tons running at 50 Km per hour, at each stopping by brakes, the heat generated is enough to melt one Kg of iron.

The arrangement and the kind of system typology, allows the realization of whole system for recovering the dissipated energy of an internal combustion engine vehicle during its running conditions, this especially for heavy transport means powered by Diesel-engine: in other words, for all public service urban vehicles such as buses and coaches, the same for heavy trucks, Diesel-engine locomotives, earth moving machines, road-building engines, and in general, for all heavy locomotion means powered by an internal combustion engine.

BRIEF DESCRIPTION OF THE DRAWINGS

FIG. 1 is a schematic view of a vehicle including a recovery system according to the invention;

FIG. 2 is a schematic view of a portion of FIG. 1 including the secondary cooling circuit subsystem.

System main components are shown in FIG. 1 and 2 with relevant "main components list".

The dissipated energy recovering system is therefore subdivided into the following subsystems:

A. PRIMARY COOLING CIRCUIT

It consists of the elements 4-2-3.

This circuit is the one of internal combustion engine cooling water system. From engine 1, cooling water which normally is mixed with another liquid as ethylene-glycol, is forced through pipe 4 to flow to heat exchanger 2, and from the latter to the radiator 3 before reentering cooling ducts within engine 1.

B. SECONDARY COOLING CIRCUIT

It consists of the elements 5-6-7-9-17.

This circuit has the task of recovering the heat, otherwise dissipated, contained in cooling water of primary circuit A. By means of an intermediary liquid having a low vaporization temperature which is forced to circulate by means of pump 17 through pipes 5, recovery of thermal energy is performed first by vaporization of intermediary liquid into heat exchanger 2, then by a subsequent superheating in heat exchanger 6, and, finally, by an adiabatic expansion producing useful work, in the steam turbine 7 installed on the turbine-air compressor shaft 9. At the end of steam expansion in steam turbine 7, the intermediary liquid, from the phase of superheated steam, as condensate is re-circulated through pipes 5 by circulation pump 17.

C. EXHAUST GASES CIRCUIT

It consists of element 8.

Smokes discharged from internal combustion engine, are dispersed in ambient air after their passage, through duct 8, to heat exchanger 6, where they have the task to superheat the intermediary liquid having a low vaporization point, previously vaporized in the heat exchanger 2.

D. COMPRESSED AIR CIRCUIT

It consists of the elements 16-10-13-11-15-12-14.

On the same turbine-air compressor shaft 9, is installed an air compressor 10, which air inlet operates through pipe 16.

Steam turbine 7 drives therefore the air compressor 10, both components being installed on the same shaft.

Compressed air produced by compressor 10 is stored through piping 13 into storage vessel 11.

Here, compressed air is available to supercharge the engine 1 through duct 14, and also through duct 15, in order to operate as motive fluid of compressed air motor 12. Compressed air motor 12 has the task to be an ancillary motor of internal combustion engine 1 during running conditions of vehicle, being both engine 1 and compressed air motor 12 being installed on the vehicle.

E. BRAKING CIRCUIT OPERATED BY AN AIR COMPRESSOR

It consists of the elements 24-25-26-30-27-28-29-31.

The braking circuit of internal combustion engine vehicle is replaced, on vehicle rear axle, by the air compressors with variable compression ratio 26, powered by a couple of gears 24 on axis with rear wheels axle, and a couple of gears 25 on axis with the same compressors 26. Compressed air, produced by air compressors 26 during vehicle braking, is stored in the pressure vessel 11 through piping 30. Similarly, the vehicle is braked on the front wheels by the air compressors with variable compression ratio 29, powered by the gears 27 which are coaxial with vehicle front wheels, and gears 28 coaxial with air compressors 29. Compressed air produced by compressors 29 is stored in storage vessel 11 through piping 31.

Gears 24 and 25 as well as gears 27 and 28 are always operating.

F. MECHANICAL USE OF THE RECOVERED THERMAL ENERGY

It consists of elements 18-19-20-21-23-33-22-32.

Compressed air produced by compressor 10, powered by a coaxial steam turbine 7, and stored into storage vessel 11 through duct 13, as it has been already seen, is available both as an air excess to supercharge the engine 1 through duct 14, and also as motive fluid for the compressed air motor 12 through duct 15.

Concerning the use of compressed air motor 12 they have the following possibilities:

Use of compressed air motor 12 to start internal combustion engine 1:
 operation of compressed air motor 12 by means of air of storage vessel 11 produces a rotation transmitted through motor-shaft 22 to the clutch 20, and from this to deviation gear box 18. Clutch 21 is kept open, thus letting the rotation transmitted to the box 18 through clutch 19 and motor-shaft 23, operates the turning of internal combustion engine 1, i.e. starts the engine itself, eliminating in this way the use of the electric starter motor.

Use of compressed air motor 12 as a replacement of internal combustion engine 1 for the movement of vehicle:
 compressed air motor 12 operates as a propulsion element of vehicle, by disengaging the clutch 19 of the propeller shaft 23 connected with the engine 1, and by engaging the clutch 20 and the clutch 21 in such a way to transmit the motion produced by the compressed air motor 12 to the differential 32 through motor shaft 22, clutch 20, deviation box 18, clutch 21 and propeller shaft 33.

TYPOLOGY OF GLOBAL SYSTEM

The system is conceived with well known elements such as heat exchangers, air compressors, steam turbine, mechanical elements such as gears, piping and ducts for fluids, etc., all easily found in the trade.

System sizing is directly depending on power of internal combustion engine, installed on the vehicle. Moreover, the system is provided with all the instruments even electronic type ones, as required for a good operation of the whole.

In the above description there is no indication in detail, for all mechanical gearing for control and adjustment, for fluid shut-off valves, for functional adjustment types and for relevant instruments and any other auxiliary parts as required for the operation of the system subject of the instant invention, since they are considered as secondary items without any influence to the purpose of this description.

It is clear that the invention is not limited to the form described and illustrated here, whereas a number of variations and further improvements may be carried out without coming out from the scope of the present invention.

MAIN COMPONENTS LIST

1. Internal combustion engine
2. Heat exchanger between primary and secondary cooling system
3. Radiator
4. Primary cooling circuit piping system
5. Secondary cooling circuit piping system
6. Heat exchanger between primary and exhaust system
7. Steam turbine
8. Exhaust circuit piping system
9. Steam turbine-air compressor shaft
10. Air compressor
11. Compressed air storage vessel
12. Compressed air motor
13. Compressed air piping system from air compressor 10 to vessel 11
14. Compressed air piping system from vessel 11 to engine 1
15. Compressed air piping system from vessel 11 to compressed air motor 12
16. Air inlet of the compressor 10
17. Secondary cooling circuit pump
18. Deviation gear box
19. Clutch
20. Clutch
21. Clutch
22. Compressed air motor transmission propeller shaft
23. Internal combustion engine transmission propeller shaft
24. Spur or single helical gear
25. Spur or single helical gear
26. Variable compression ratio air compressor
27. Spur or single helical gear
28. Spur or single helical gear
29. Variable compression ratio air compressor
30. Compressed air piping system for air compressor 26
31. Compressed air piping system for air compressor 29
32. Rear axle differential
33. Propeller shaft of rear axle differential.

I claim:

1. Recovery system for recovering dissipated energy of an engine driven motor vehicle during its running, said system consisting of:

a primary cooling circuit of an internal combustion engine consisting of a first pipe through which a primary cooling fluid flows from said internal combustion engine through a first heat exchanger and a radiator before coming back to said internal combustion engine, a secondary cooling circuit consisting of a second pipe through which an intermediary fluid flows from said first heat exchanger through a second heat exchanger to a steam turbine which drives an air compressor before said intermediary fluid is returned back to said first heat exchanger, a circulation pump connected to said second pipe to force said intermediary fluid through said secondary cooling circuit, a circuit of hot exhaust gases of said internal combustion engine which flow from an exhaust of said combustion engine through said second heat exchanger, wherein said intermediary fluid having a low vaporization temperature point flows through said secondary circuit and is vaporized in said first heat exchanger by thermal exchange with said primary cooling fluid and superheated in said second heat exchanger by thermal exchange with said hot exhaust gases which are discharged from said internal combustion engine, the intermediary fluid producing mechanical work during its adiabatic expansion in said steam turbine; said recovery system further consisting of:

a compressed air circuit including said air compressor driven by said steam turbine and a storage vessel, connected to said air compressor by a pipe, to store compressed air produced by said air compressor;

variable compression ratio air compressors, each of which replaces a braking device of said vehicle and, is powered through a plurality of gears that are connected to an axis of wheels of said vehicle to allow the braking of said vehicle;

pipes connecting to said storage vessel an output of each of said variable compression ratio air compressors;

a compressed air motor powered by said compressed air stored in said storage vessel and being able to operate in place of said internal combustion engine which is installed on said engine motor vehicle.

2. Recovery system for recovering dissipated energy of an engine motor vehicle during its running, according to claim 1 wherein said internal combustion engine that is installed on said engine motor vehicle has means, connected to said storage vessel by a pipe, to supercharge said engine by compressed air which is stored in said storage vessel.

3. Recovery system for dissipated energy of an engine motor vehicle during its running, according to claim 1, wherein said internal combustion engine is started, instead of by an electric starting motor, by said compressed air motor, a motor-shaft of said compressed air motor being connected to a shaft of said internal combustion engine through a first clutch, a deviation gear box and a second clutch.

4. Recovery system for dissipated energy of an engine motor vehicle during its running, according to claim 1, wherein said internal combustion engine is replaceable by said compressed air motor to move said vehicle.

5. Recovery system for dissipated energy of an engine motor vehicle during its running according to claim 4, wherein a motor-shaft of said compressed air motor is connected to moving wheels of said vehicle through said first clutch, said deviation gear box, a third clutch, a propeller shaft and a differential.

* * * * *